US012758995B2

(12) United States Patent
Qin et al.

(10) Patent No.: US 12,758,995 B2
(45) Date of Patent: Oct. 13, 2026

(54) FLUID DISPENSING NOZZLE WITH GAS CHANNEL AND METHOD OF USING AND ASSEMBLING THE SAME

(71) Applicant: Nordson Corporation, Westlake, OH (US)

(72) Inventors: Jian Qin, Shanghai (CN); Chunyun Qin, Shanghai (CN)

(73) Assignee: Nordson Corporation, Westlake, OH (US)

( * ) Notice: Subject to any disclaimer, the term of this patent is extended or adjusted under 35 U.S.C. 154(b) by 662 days.

(21) Appl. No.: 17/908,723

(22) PCT Filed: Mar. 4, 2021

(86) PCT No.: PCT/US2021/020844
§ 371 (c)(1),
(2) Date: Sep. 1, 2022

(87) PCT Pub. No.: WO2021/178647
PCT Pub. Date: Sep. 10, 2021

(65) Prior Publication Data

US 2023/0128483 A1 Apr. 27, 2023

Related U.S. Application Data

(60) Provisional application No. 62/986,467, filed on Mar. 6, 2020.

(51) Int. Cl.
*B05B 7/06* (2006.01)
*B05C 5/02* (2006.01)
*B05C 11/10* (2006.01)

(52) U.S. Cl.
CPC ................ *B05B 7/068* (2013.01); *B05C 5/02* (2013.01); *B05C 11/1034* (2013.01)

(58) Field of Classification Search
CPC ............ B05B 7/068; B05B 7/066; B05C 5/02
(Continued)

(56) References Cited

U.S. PATENT DOCUMENTS 2,149,181 A * 2/1939 Krautzberger ........ B05B 7/1209 239/528
3,062,455 A 11/1962 Reip
(Continued)

FOREIGN PATENT DOCUMENTS

CN 102431289 A 5/2012
CN 102947007 A 2/2013
(Continued)

OTHER PUBLICATIONS

IPEA/409—International Preliminary Report on Patentability Mailed on Sep. 8, 2022 for WO Application No. PCT/US21/020844.
(Continued)

*Primary Examiner* — Tuongminh N Pham
*Assistant Examiner* — Andrew Domenic Ondrejcak
(74) *Attorney, Agent, or Firm* — BakerHostetler

(57) ABSTRACT

In one example, a nozzle of a fluid material dispenser has a first nozzle body and a second nozzle body. The first body has a first inlet end, a first outlet end, a first outer surface extending, and a first inner surface. The first inner surface defines a first channel that can direct a fluid material from the first inlet end to the first outlet end. The second body has a second inlet end, a second outlet end, a second outer surface, and a second inner surface. The second inner surface defines a second channel that can receive at least a portion of the first nozzle body therein such that the first outer surface is inwardly spaced from the second inner surface so as to define a space between the first outer surface and the second inner surface. The space can direct a gas to the second outlet end.

18 Claims, 5 Drawing Sheets

(58) Field of Classification Search
USPC .................................................. 239/290–301
See application file for complete search history.

(56) References Cited

U.S. PATENT DOCUMENTS

| | | | | |
|---|---|---|---|---|
| 4,335,677 | A | 6/1982 | Nagata et al. | |
| 4,970,985 | A | 11/1990 | Slautterback | |
| 5,065,943 | A | 11/1991 | Boger et al. | |
| 5,230,736 | A | 7/1993 | Schnodewind | |
| 5,294,459 | A * | 3/1994 | Hogan | B05B 9/002 427/427 |
| 5,322,564 | A | 6/1994 | Ludwig et al. | |
| 5,418,009 | A | 5/1995 | Raterman et al. | |
| 5,421,921 | A * | 6/1995 | Gill | B05C 5/0254 264/211.13 |
| 5,431,343 | A | 7/1995 | Kubiak et al. | |
| 5,524,828 | A * | 6/1996 | Raterman | B05D 1/265 239/413 |
| 5,685,911 | A | 11/1997 | Raterman et al. | |
| 6,012,647 | A | 1/2000 | Ruta et al. | |
| 6,082,637 | A * | 7/2000 | Ludwig | B05C 5/02 239/296 |
| 6,132,809 | A | 10/2000 | Hynes et al. | |
| 6,149,076 | A * | 11/2000 | Riney | B05B 7/0861 239/424.5 |
| 6,170,760 | B1 * | 1/2001 | Bievenue | B05B 7/0815 239/296 |
| 6,270,019 | B1 | 8/2001 | Reighard | |
| 6,291,016 | B1 | 9/2001 | Donges et al. | |
| 6,325,853 | B1 * | 12/2001 | Hogan | H05K 3/0091 118/DIG. 2 |
| 6,523,757 | B1 | 2/2003 | Bievenue et al. | |
| 7,028,867 | B2 * | 4/2006 | Acum | H05K 3/0091 222/63 |
| 7,070,066 | B2 * | 7/2006 | Strong | B05B 7/1263 222/31 |
| 7,621,465 | B2 * | 11/2009 | Riney | B05B 7/0807 118/325 |
| 7,690,539 | B1 | 4/2010 | Tudor et al. | |
| 12,179,222 | B2 * | 12/2024 | Pahl | B05B 1/06 |
| 2004/0221805 | A1 | 11/2004 | Klingel | |
| 2005/0095365 | A1 | 5/2005 | Acum et al. | |
| 2005/0120947 | A1 | 6/2005 | Sone et al. | |
| 2007/0102539 | A1 | 5/2007 | Riney | |
| 2008/0164335 | A1 | 7/2008 | Quinones et al. | |
| 2009/0199848 | A1 | 8/2009 | Sharratt | |
| 2010/0224121 | A1 | 9/2010 | Klingel | |
| 2013/0032644 | A1 | 2/2013 | Huffman et al. | |
| 2013/0245576 | A1 | 9/2013 | Hoogenakker et al. | |
| 2016/0038693 | A1 | 2/2016 | Kirk et al. | |
| 2016/0228896 | A1 | 8/2016 | Jones | |
| 2016/0288145 | A1 | 10/2016 | Zumberger et al. | |
| 2017/0120269 | A1 | 5/2017 | Scheibner et al. | |

FOREIGN PATENT DOCUMENTS

| | | | |
|---|---|---|---|
| CN | 103301556 | A | 9/2013 |
| CN | 104624426 | A | 5/2015 |
| CN | 105855073 | A | 8/2016 |
| CN | 106457280 | A | 2/2017 |
| CN | 107427850 | A | 12/2017 |
| CN | 110369169 | A | 10/2019 |
| DE | 3329880 | A1 | 3/1984 |
| DE | 10261576 | A1 | 7/2004 |
| EP | 1057542 | A2 | 12/2000 |
| EP | 2228138 | B1 | 8/2013 |
| EP | 3165288 | A1 | 5/2017 |
| GB | 2129711 | A | 5/1984 |
| JP | 05-138102 | A | 6/1993 |
| JP | 05-309310 | A | 11/1993 |
| TW | 201600175 | A | 1/2016 |
| WO | 94/01222 | A1 | 1/1994 |

OTHER PUBLICATIONS

ISA/220—Notification of Transmittal or Search Report and Written Opinion of the ISA, or the Declaration Mailed on Jun. 18, 2021 for WO Application No. PCT/US21/020844.

* cited by examiner

FLUID DISPENSING NOZZLE WITH GAS CHANNEL AND METHOD OF USING AND ASSEMBLING THE SAME

CROSS REFERENCE TO RELATED APPLICATIONS

This application is a National Stage Application of International Patent App. No. PCT/US2021/020844, filed Mar. 4, 2021, which claims the benefit of U.S. Provisional Application No. 62/986,467, filed Mar. 6, 2020, the entirety of both of which are incorporated by reference herein for any and all purposes.

TECHNICAL FIELD

This disclosure generally relates to fluid material dispensing systems such as adhesive dispensing systems, and more particularly to nozzles of the fluid dispensing systems and methods of using the same.

BACKGROUND

Fluid material dispensing systems commonly employ different types of nozzles to discharge fluid material beads onto substrates in different shapes. One problem with conventional nozzles is that they tend to produce strings of fluid material between the nozzle and the bead dispensed on the substrate.

BRIEF DESCRIPTION OF THE DRAWINGS

The following description of the illustrative examples may be better understood when read in conjunction with the appended drawings. It is understood that potential examples of the disclosed systems and methods are not limited to those depicted.

DETAILED DESCRIPTION

Figure 1:
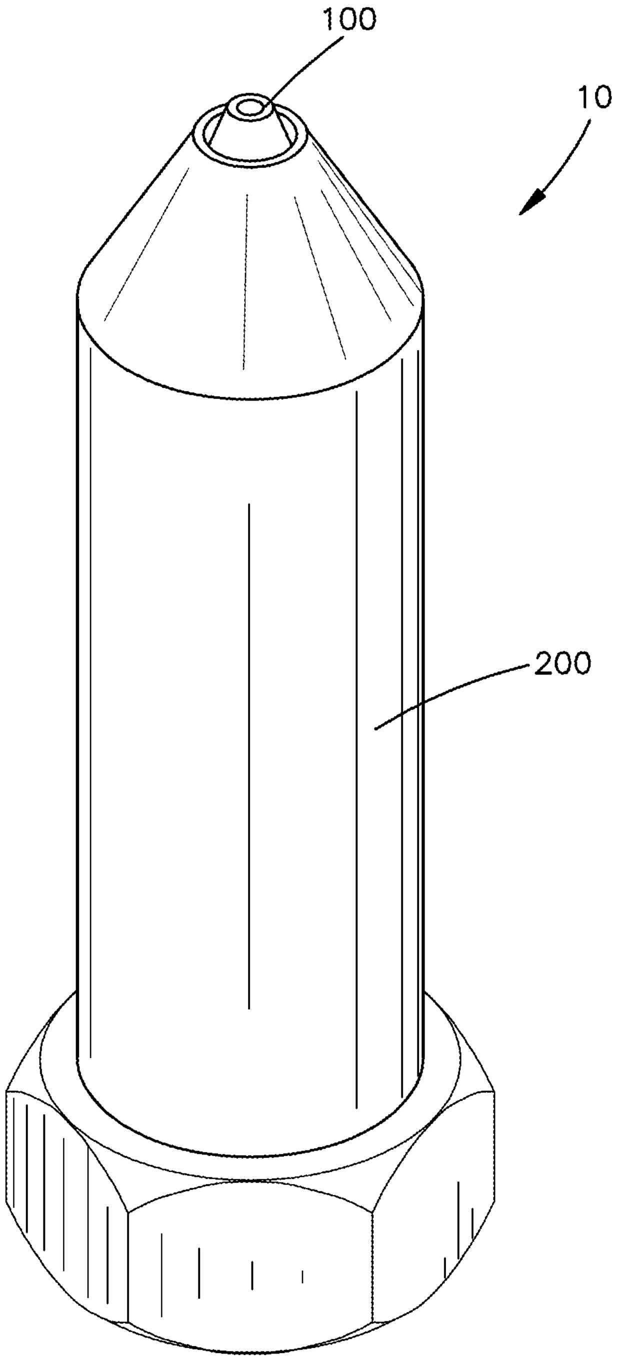
FIG. 1 shows a perspective view of a nozzle according to one example having a first nozzle body received in a second nozzle body.

Referring generally to FIGS. 1-6, a nozzle 10 a fluid material dispenser is shown according to one example that comprises a first nozzle body 100 and a second nozzle body 200. The first nozzle body 100 has a first inlet end 102, a first outlet end 104, a first outer surface 106 extending between the first inlet end 102 and the first outlet end 104, and a first inner surface 108 (shown in FIG. 5) opposite the first outer surface 106. The first outlet end 104 can be offset from the first inlet end 102 along a longitudinal axis A that extends along a distal direction D. The first inner surface 108 defines a first channel 110 that is configured to direct a fluid material from the first inlet end 102 to the first outlet end 104. As one example, the fluid material can be an adhesive.

The second nozzle body 200 has a second inlet end 202, a second outlet end 204, a second outer surface 206 extending between the second inlet end 202 and the second outlet end 204, and a second inner surface 208 (shown in FIG. 5) opposite the second outer surface 206. The second outlet end 204 can be offset from the second inlet end 202 along a longitudinal axis A that extends along a distal direction D. The second inner surface 208 defines a second channel 210 that is configured to receive at least a portion of the first nozzle body 100 therein such that at least a portion of the first outer surface 106 is inwardly spaced from the second inner surface 208 so as to define a space 20 between the first outer surface 106 and the second inner surface 208. The space 20 is configured to direct a gas to the second outlet end 204.

Figure 2:
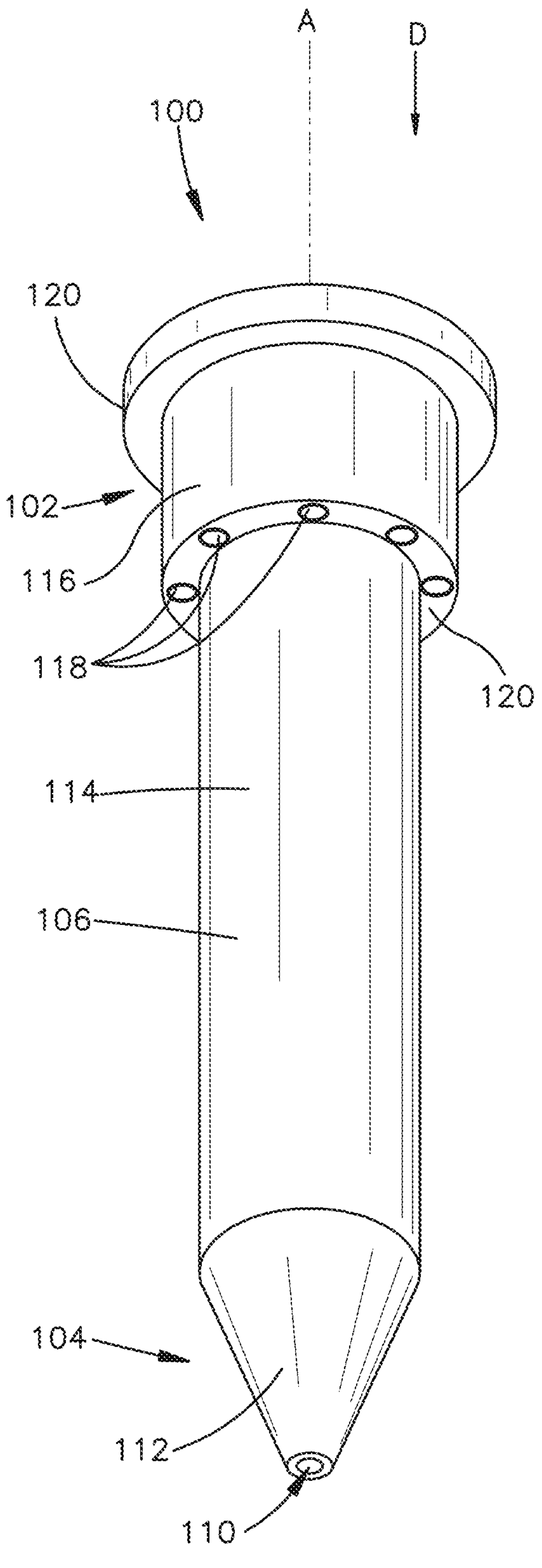
FIG. 2 shows a perspective view of the first nozzle body of the nozzle of FIG. 1.
Figure 5:
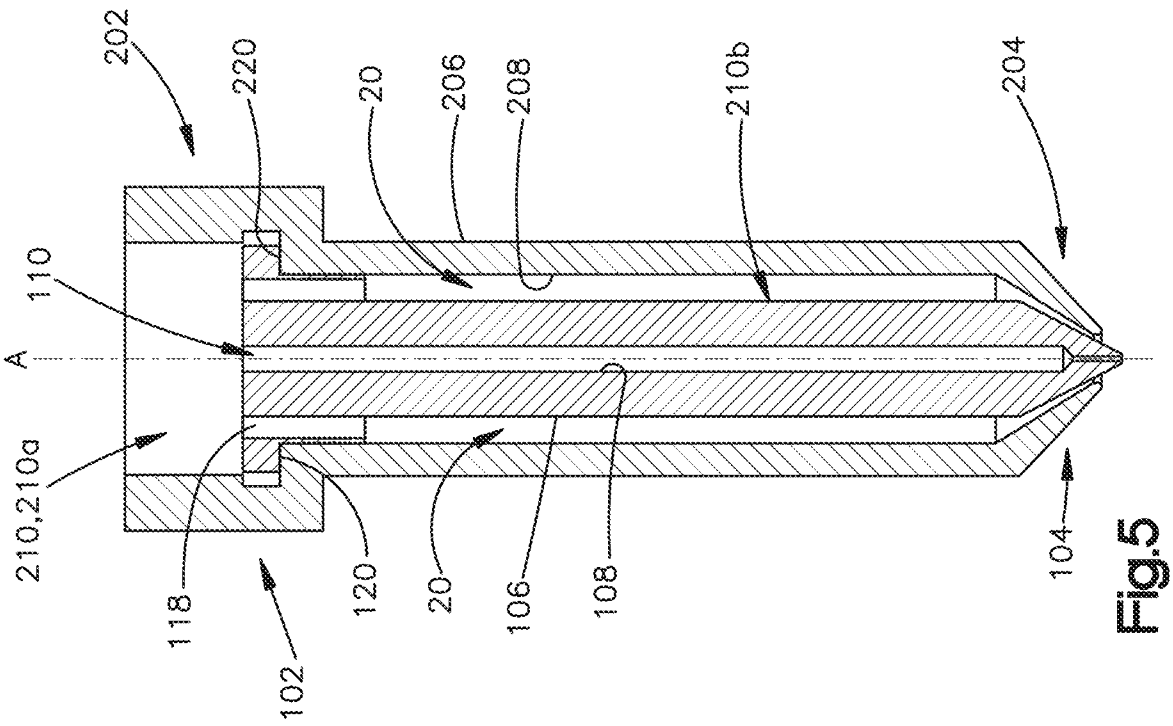
FIG. 5 shows a cross-sectional elevation view of the nozzle of FIG. 1 taken along the line 5-5.
Figure 4:
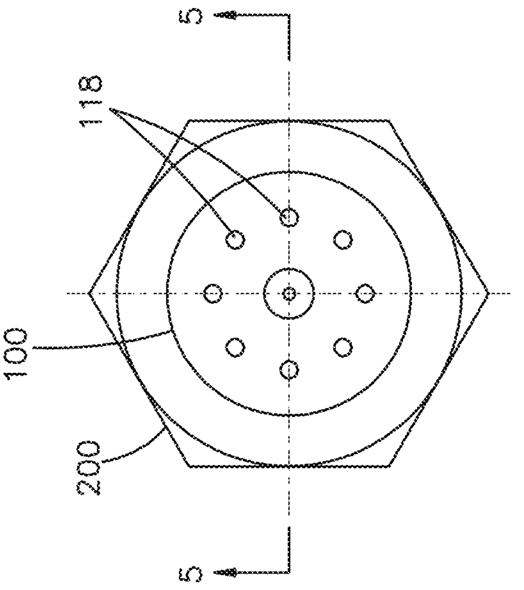
FIG. 4 shows a top plan view of the nozzle of FIG. 1.
Figure 6:
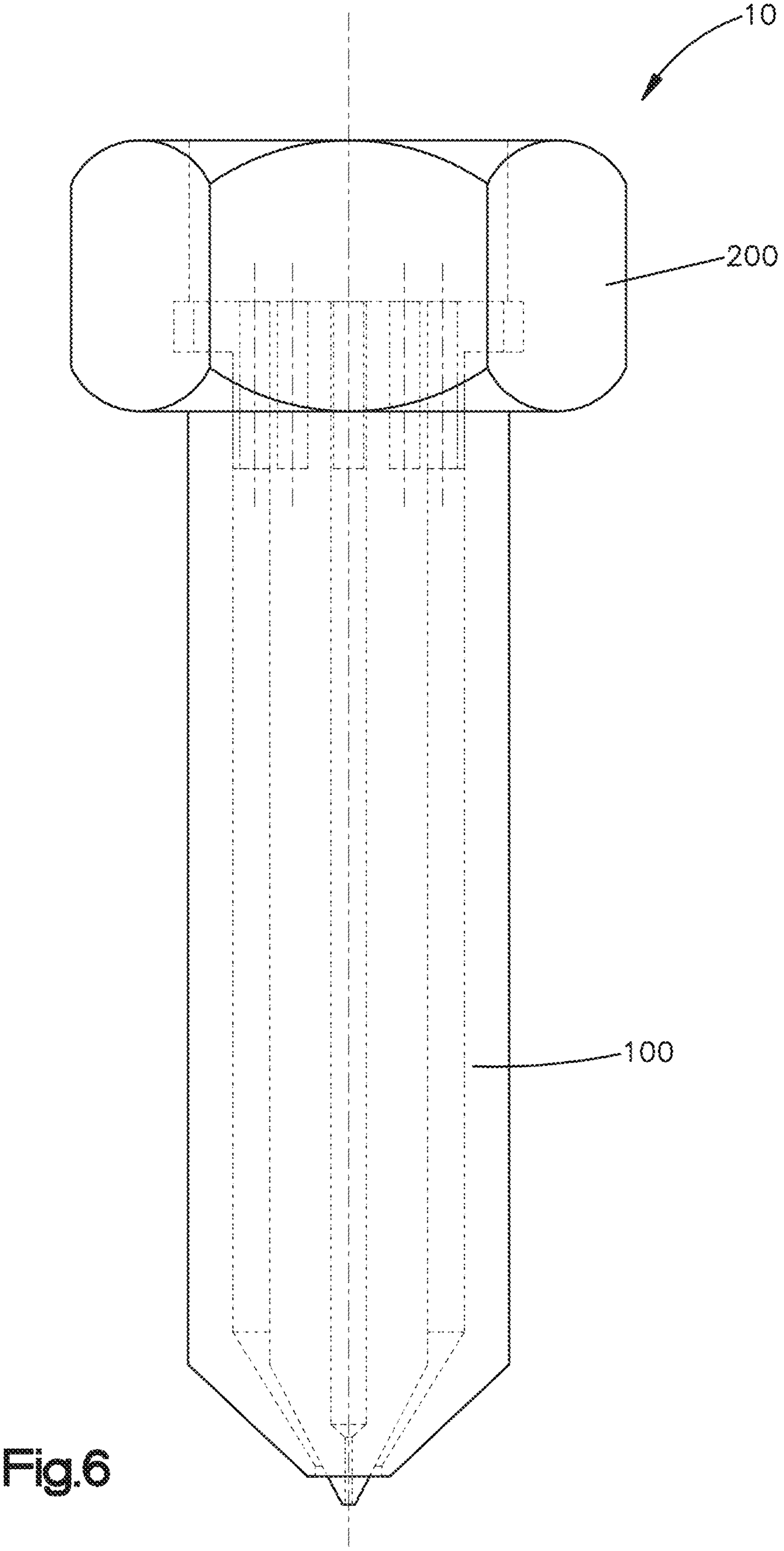
FIG. 6 shows a side elevation view of the nozzle of FIG. 1 with the first nozzle body and inner surface of the second nozzle body shown in hidden lines.

Turning now more specifically to the first nozzle body 100, and with reference to FIGS. 2, 4, and 5, the first nozzle body 100 can have a substantially tubular shape. The first outlet end 104 defines a tip 112. The tip 112 can preferably project out of the second outlet end 204 when the first nozzle body 100 is received in the second nozzle body 200. However, it will be understood that in alternative examples, the tip 112 need not extend out of the second outlet end 204. The tip 112 is tapered inwardly as the tip 112 extends in the direction D. The tip can have a conical shape, although other shapes are contemplated. The first outer surface 106 at the tip 112 forms an oblique tip angle TA with the longitudinal axis A. In one example, the tip angle can be between about 10 degrees and about 40 degrees. In another example, the tip angle can be between about 20 degrees and 30 degrees. In yet another example, the tip is approximately 25 degrees.

The first nozzle body 100 can comprise a first body portion 114 that defines the first outer surface 106. The first nozzle body 100 can comprise an enlarged body portion 116 having a cross-sectional dimension that is greater than a cross-sectional dimension of the first body portion 114. When the first nozzle body 100 is received in the second nozzle body 200, the enlarged body portion 116 can space the first body portion 114 from the second inner surface 208. The first body portion 114 can extend from the enlarged body portion 116 along the distal direction D. For example, the enlarged body portion 116 can be disposed at a proximal end of the first body portion 114. In alternative examples (not shown), the enlarged body portion 116 can be disposed between proximal end distal ends of the first body portion 114. The enlarged body portion 116 can define at least one bore 118 that extends therethrough along the distal direction D such that a gas can pass through the at least one bore 118 along the distal direction D and into the space 20.

The first nozzle body 100 can define a stop 120 that is configured to engage a corresponding stop 220 (shown in FIG. 5) of the second nozzle body 200 so as to limit an insertion depth of the first nozzle body 100 into the second nozzle body 200. The stop 120 can be a protrusion that extends radially out relative to the first outer surface 106. The stop 120 can have an annular shape. The enlarged body portion 116 can extend between the stop 120 and the first body portion 114. The stop 120 can define at least one bore 118 that extends therethrough along the distal direction D such that a gas can pass through the at least one bore 118 along the distal direction D towards the space 20. The at least one bore 118 of the stop 120 can be aligned with the at least one bore 118 of the enlarged body portion 116 such that a gas can pass through the at least one bore 118 of each of the stop 120 and the enlarged body portion 116.

Figure 3:
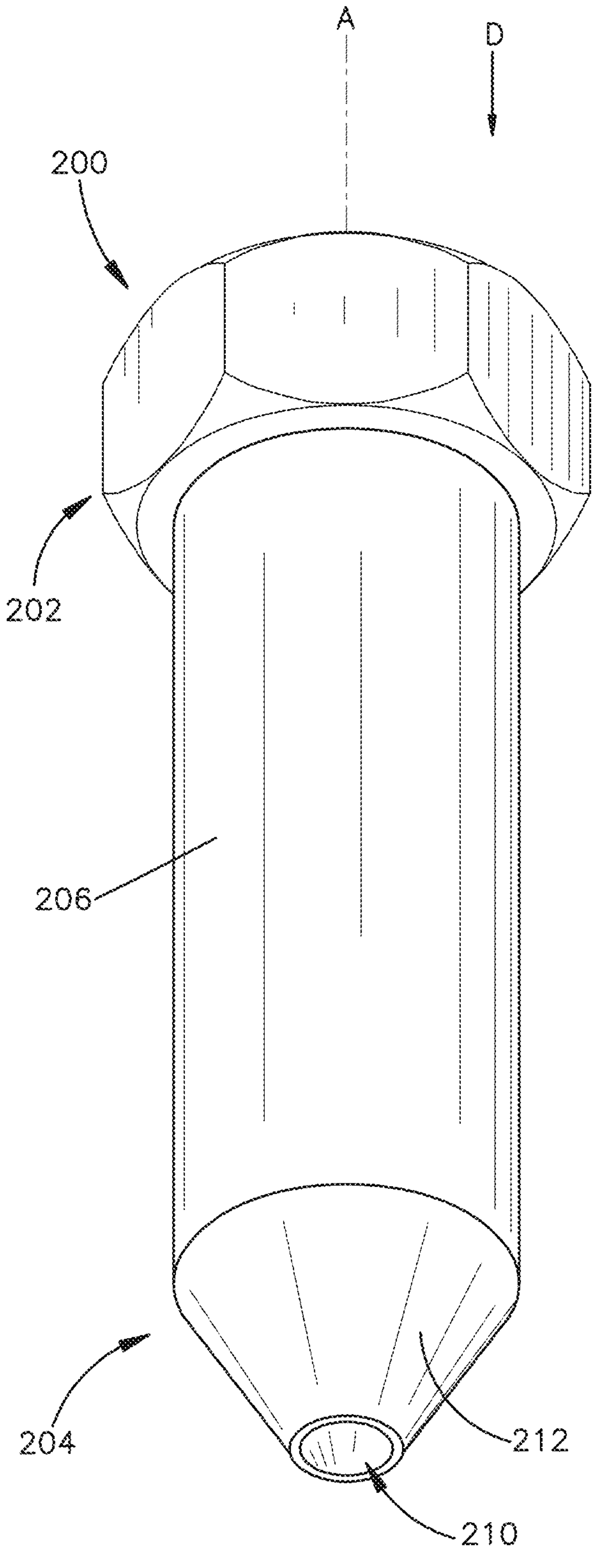
FIG. 3 shows a perspective view of the second nozzle body of the nozzle of FIG. 2.

Turning now more specifically to the second nozzle body 200, and with reference to FIGS. 3, 4, and 5, the second nozzle body 200 can have a substantially tubular shape, although other shapes are contemplated. The second inner surface 208 has a cross-sectional dimension that is greater than a cross-sectional dimension of the first outer surface 106. The second channel 210 can have a proximal channel portion 210*a* and a distal channel portion 210*b*. The proximal channel portion 210*a* can have a cross-sectional dimension that is greater than a cross-sectional dimension of the distal channel portion 210*b*. The proximal channel portion 210*a* is configured to receive the stop 120 of the first nozzle body 100. The proximal channel portion 210*a* can define a stop 220 that is configured to engage the stop 120 of the first nozzle body 100 to limit an insertion depth of the first nozzle body 100 into the second nozzle body 200. The first and second channel portions 210*a* and 210*b* can meet at a shoulder that defines the stop 220, although the stop 22 can be configured in any other suitable matter. The stop 120 of the first nozzle body 100 defines a cross-sectional sectional dimension that is greater than a cross-sectional dimension of the distal channel portion 210*b* of the second nozzle body 200.

The second nozzle body 200 defines a tip 212. The tip 212 can be tapered inwardly as the tip 212 extends in the distal direction D. The tip 212 can have a conical shape or any other suitable shape. The tip 112 of the first nozzle body 100 can project out of the tip 212 of the second nozzle body 200, although alternative examples of the disclosure are not so limited. In one example, the second inner surface 208 at the tip 212 forms a tip angle with the longitudinal axis A of between about 10 degrees and about 80 degrees. In another example, the tip angle is between about 25 degrees and about 35 degrees. In yet another example, the tip angle is approximately 30 degrees.

The space 20 between the first outer surface 106 and the second inner surface 208 can extend at least partially around the first outer surface 106. For example, the space 20 can extend around at least a quarter of the first outer surface 106. In another example, the space 20 can extend around at least half of the first outer surface 106. In yet another example, the space 20 can extend around at least three quarters of the first outer surface 106. In yet still another example, the space 20 can extend around an entirety of the first outer surface 106. For instance, the space 20 can have a substantially annular cross section. The space 20 can extend between the first and second nozzle bodies 100 and 200 at the tips 112 and 212. It will be understood that, in alternative examples, the nozzle 10 can define a plurality of spaces 20 between the first outer surface 106 and the second inner surface 208 that are spaced around the first outer surface 106.

The second nozzle body 200 defines an opening at the second inlet end 202 that defines an inlet for both the pressurized gas and the fluid material. The second outer surface 206 can be devoid of any openings that are in fluid communication with the space 20. The first nozzle body 100 and the second nozzle body 200 can be configured to be positionally fixed relative to one another as the nozzle 10 discharges each of the fluid material and the pressurized gas.

In an example (not shown), a fluid material dispensing system can comprise the nozzle 10, and one or both of (1) a fluid material source (not shown) configured to supply fluid material to the nozzle 10, and (2) a pressurized gas source (not shown) configured to supply a pressurized gas to the nozzle 10.

Referring to FIG. 5, a method of assembling the nozzle 10 can comprise a step of receiving the first nozzle body 100 into the second channel 210 of the second nozzle body 200 such that at least a portion of the first outer surface 106 is inwardly spaced from the second inner surface 208 so as to define the space 20 between the first outer surface 106 and the second inner surface 208. The receiving step can comprise receiving the first nozzle body 100 into the second nozzle body 200 such that an enlarged body portion 116 of the first nozzle body 100 is received in the second channel 210 of the second nozzle body 200. The receiving step can comprise receiving the first nozzle body 100 into the second nozzle body 200 until a stop 120 of the first nozzle body 100 engages a corresponding stop 220 of the second nozzle body 200. The receiving step can comprise receiving the first nozzle body 100 into the second nozzle body 200 such that the tip 112 of the first nozzle body 100 extends out of a tip 212 of the second nozzle body 200.

Figure 7:
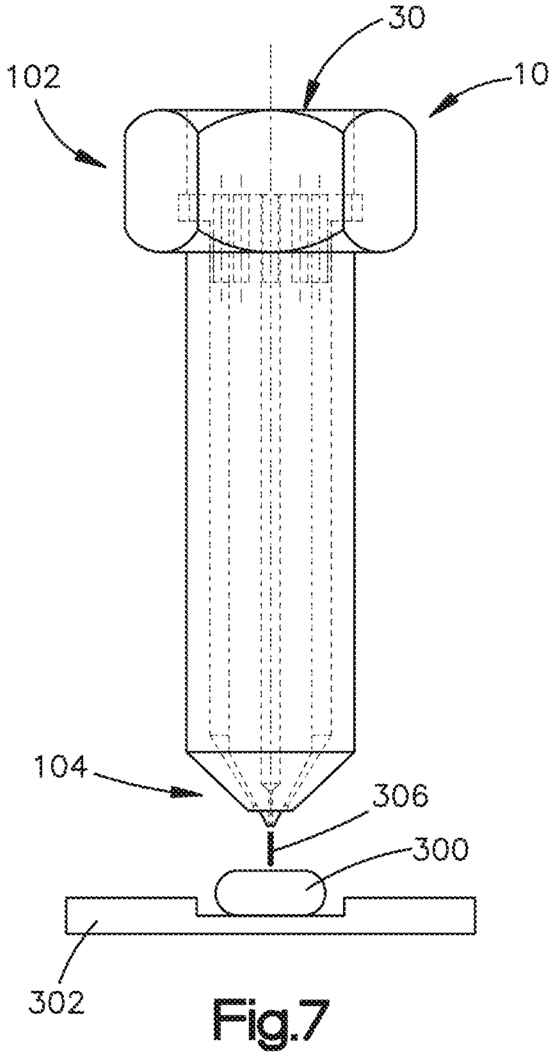
FIG. 7 shows a side elevation view of the nozzle of FIG. 1 dispensing a bead of fluid material onto a substrate.
Figure 8:
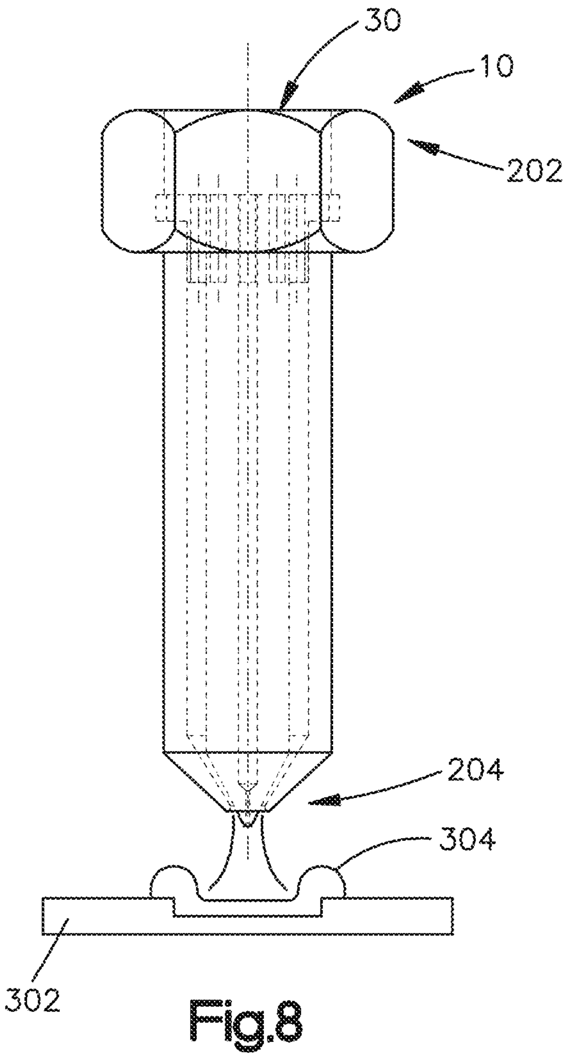
FIG. 8 shows a side elevation view of the nozzle of FIG. 1 dispensing a gas onto the bead of fluid material so as to deform the bead.
Figure 9:
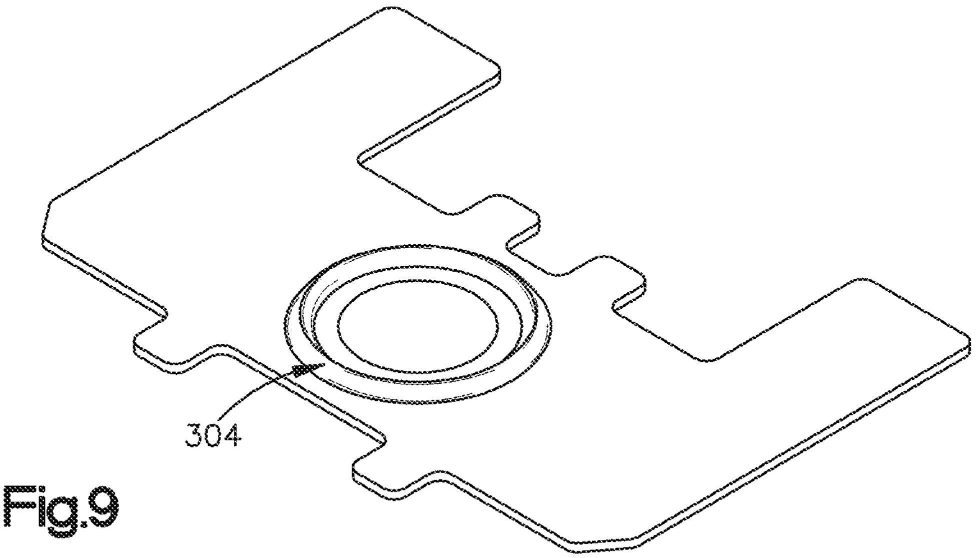
FIG. 9 shows a perspective view of the deformed bead of FIG. 8 on a substrate.

Turning now to FIGS. 7 to 9, a method of dispensing a fluid material onto a substrate from the nozzle 10 can comprise a step (illustrated in FIG. 7) of discharging the fluid material from the first channel 110 of first nozzle body 100 through the first outlet end 104 so as to form a bead 300 of the fluid material on the substrate 302, and a step (illustrated in FIG. 8) of discharging a pressurized gas (such as, without limitation, air) through the space 20, out of the second outlet end 204, and onto the bead 300 so as to deform the bead 300 into a deformed bead 304.

During the step of discharging the bead 300, a string 306 of the fluid material can form that extends from the bead 300 to the first outlet end 104. The step of discharging the pressurized gas can cause the string 306 to break. Accordingly, discharging the pressurized gas through the nozzle 10 can clean the tip of the nozzle. The step of discharging the fluid material can comprise directing the fluid material into an inlet 30 of the nozzle 10, and the step of discharging the pressurized gas can comprise directing the pressurized gas into the inlet 30 that the fluid material is directed into. Accordingly, the nozzle 10 can include a single inlet 30 for both the fluid material and the pressurized gas. The method can comprise discharging the fluid material and the pressurized gas without moving the first nozzle body 100 relative to the second nozzle body 200.

The step of discharging the pressurized gas can comprise discharging a burst of the gas. The step of discharging the pressurized gas can comprise discharging the pressurized gas through at least one bore 118 defined through an enlarged portion 116 of the first nozzle body 100 and into the space 20. The method can comprise a step of heating the pressurized gas before discharging the pressurized gas through the nozzle 10. The step of discharging the pressurized gas can deform the bead 300 of fluid material such that a center of the deformed fluid material 304 is flatter than a center of the bead 300 of fluid material. The step of discharging the pressurized gas can deform the bead 300 of fluid material such that an outer perimeter of the deformed fluid material 304 has a substantially toroidal shape. In at least some examples, the nozzle 10 can discharge the pressurized gas without causing the pressurized gas to swirl.

It should be noted that the illustrations and descriptions of the examples shown in the figures are for exemplary purposes only, and should not be construed limiting the disclosure. One skilled in the art will appreciate that the present disclosure contemplates various examples. Additionally, it should be understood that the concepts described above with the above-described examples may be employed alone or in combination with any of the other examples described above. It should further be appreciated that the various alternative examples described above with respect to one illustrated example can apply to all examples as described herein, unless otherwise indicated.

Unless explicitly stated otherwise, each numerical value and range should be interpreted as being approximate as if the word "about," "approximately," or "substantially" preceded the value or range.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more examples or that one or more examples necessarily include these features, elements and/or steps. The terms "comprising," "including," "having," and the like are synonymous and are used inclusively, in an open-ended fashion, and do not exclude additional elements, features, acts, operations, and so forth.

While certain examples have been described, these examples have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

It will be understood that reference herein to "a" or "one" to describe a feature such as a component or step does not foreclose additional features or multiples of the feature. For instance, reference to a device having or defining "one" of a feature does not preclude the device from having or defining more than one of the feature, as long as the device has or defines at least one of the feature. Similarly, reference herein to "one of" a plurality of features does not foreclose the invention from including two or more, up to all, of the features. For instance, reference to a device having or defining "one of a X and Y" does not foreclose the device from having both the X and Y.

What is claimed:

1. A nozzle of a fluid material dispenser, the nozzle comprising:

a first nozzle body having a first inlet end, a first outlet end, a first outer surface extending between the first inlet end and the first outlet end, and a first inner surface opposite the first outer surface, the first inner surface defining a first channel that is configured to direct a fluid material from the first inlet end to the first outlet end; and a second nozzle body having a second inlet end, a second outlet end, a second outer surface extending between the second inlet end and the second outlet end, and a second inner surface opposite the second outer surface, the second inner surface defining a second channel that is configured to receive at least a portion of the first nozzle body therein such that at least a portion of the first outer surface is inwardly spaced from the second inner surface so as to define a space between the first outer surface and the second inner surface, the space configured to direct a gas to the second outlet end, wherein the first nozzle body comprises a first body portion that defines the first outer surface, and an enlarged body portion having a cross-sectional dimension that is greater than a cross-sectional dimension of the first body portion such that, when the first nozzle body is received in the second nozzle body, the enlarged body portion spaces the first body portion from the second inner surface, and wherein the enlarged body portion defines a first surface that faces along a proximal direction, a second surface that faces away from the first surface along a distal direction opposite the proximal direction, and at least one bore that extends entirely through the enlarged body portion along the distal direction, from the first surface to the second surface, such that a gas can pass through the at least one bore along the distal direction and into the space.

2. The nozzle of claim 1, wherein the first outlet end defines a tip.

3. The nozzle of claim 2, wherein the first body portion is formed by an undivided single piece of material that defines the tip, which projects out of the second outlet end when the first nozzle body is received in the second nozzle body.

4. The nozzle of claim 2, wherein the tip is tapered inwardly as the tip extends in the distal direction that extends from the first inlet end towards the first outlet end.

5. The nozzle of claim 2, wherein the tip has a conical shape.

6. The nozzle of claim 2, wherein the first inlet end and the first outlet end are offset from one another along a longitudinal axis, and the first outer surface at the tip forms an oblique tip angle with the longitudinal axis.

7. The nozzle of claim 2, wherein the first inlet end and the first outlet end are offset from one another along a longitudinal axis, and the first outer surface at the tip forms a tip angle with the longitudinal axis of between 10 degrees and 40 degrees.

8. The nozzle of claim 1, wherein the first body portion is formed by a first undivided single piece of material and extends from the enlarged body portion to the first outlet end, and wherein the second nozzle body is formed by a second undivided single piece of material.

9. The nozzle of claim 1, wherein the first nozzle body defines a stop that is configured to engage a corresponding stop of the second nozzle body so as to limit an insertion depth of the first nozzle body into the second nozzle body.

10. The nozzle of claim 1, wherein the first nozzle body has a tubular shape, and wherein the space has an annular shape that continuously circumscribes a length of the first nozzle body.

11. The nozzle of claim 1, wherein the second outer surface is devoid of any openings that are in fluid communication with the space.

12. A nozzle of a fluid material dispenser, the nozzle comprising:

a first nozzle body having a first inlet end, a first outlet end, a first outer surface extending between the first inlet end and the first outlet end, and a first inner surface opposite the first outer surface, the first inner surface defining a first channel that is configured to direct a fluid material from the first inlet end to the first outlet end; and a second nozzle body having a second inlet end, a second outlet end, a second outer surface extending between the second inlet end and the second outlet end, and a second inner surface opposite the second outer surface, the second inner surface defining a second channel that is configured to receive at least a portion of the first nozzle body therein such that at least a portion of the first outer surface is inwardly spaced from the second inner surface so as to define a space between the first outer surface and the second inner surface, the space configured to direct a gas to the second outlet end, wherein the first nozzle body comprises a first body portion that defines the first outer surface, and an enlarged body portion having a cross-sectional dimension that is greater than a cross-sectional dimension of the first body portion such that, when the first nozzle body is received in the second nozzle body, the enlarged body portion spaces the first body portion from the second inner surface, wherein the enlarged body portion defines at least one bore that extends therethrough along a distal direction such that a gas can pass through the at least one bore along the distal direction and into the space, wherein the first nozzle body and the second nozzle body are configured to be positionally fixed relative to one another as the nozzle discharges the fluid material and a pressurized gas, wherein the second nozzle body is formed by an undivided single piece of material, and wherein an entirety of the first inlet end of the first nozzle body is disposed within the second nozzle body such that the second inlet end of the second nozzle body extends beyond the first inlet end in a proximal direction that extends away from the first outlet end along a longitudinal axis of the nozzle.

13. A fluid material dispensing system, comprising:

the nozzle of claim 1;

a fluid material source configured to supply fluid material to the nozzle; and a pressurized gas source configured to supply a pressurized gas to the nozzle.

14. A method of assembling the nozzle of claim 1, the method comprising:

receiving the first nozzle body into the second channel of the second nozzle body such that at least a portion of the first outer surface is inwardly spaced from the second inner surface so as to define the space between the first outer surface and the second inner surface, the space configured to direct a gas to the second outlet end.

15. A method of dispensing a fluid material onto a substrate from the nozzle of claim 1, the method comprising:

discharging the fluid material from the first channel of first nozzle body through the first outlet end so as to form a bead of the fluid material on the substrate; and discharging a pressurized gas through the space, out of the second outlet end, and onto the bead so as to deform the bead.

16. The method of claim 15, wherein the step of discharging the pressurized gas comprises discharging the pressurized gas through at least one bore defined through an enlarged body portion of the first nozzle body and into the space.

17. The method of claim 15, wherein, during the step of discharging the bead, a string of the fluid material forms that extends from the bead to the first outlet end, and the step of discharging the pressurized gas causes a string to break.

18. A nozzle of a fluid material dispenser, the nozzle comprising:

a first nozzle body having a first inlet end, a first outlet end, a first outer surface extending between the first inlet end and the first outlet end, and a first inner surface opposite the first outer surface, the first inner surface defining a first channel that is configured to direct a fluid material from the first inlet end to the first outlet end; and a second nozzle body having a second inlet end, a second outlet end, a second outer surface extending between the second inlet end and the second outlet end, and a second inner surface opposite the second outer surface, the second inner surface defining a second channel that is configured to receive at least a portion of the first nozzle body therein such that at least a portion of the first outer surface is inwardly spaced from the second inner surface so as to define a space between the first outer surface and the second inner surface, the space configured to direct a gas to the second outlet end, wherein the first nozzle body comprises a first body portion that defines the first outer surface, and an enlarged body portion having a cross-sectional dimension that is greater than a cross-sectional dimension of the first body portion such that, when the first nozzle body is received in the second nozzle body, the enlarged body portion spaces the first body portion from the second inner surface, and wherein the second nozzle body is formed by an undivided single piece of material, wherein the first nozzle body is in contact with the second nozzle body, and wherein an entirety of the first inlet end of the first nozzle body is disposed within the second nozzle body.

* * * * *